(12) United States Patent
Smeets et al.

(10) Patent No.: US 6,947,560 B1
(45) Date of Patent: Sep. 20, 2005

(54) METHOD AND DEVICE FOR EFFECTIVE KEY LENGTH CONTROL

(75) Inventors: Ben Smeets, Dalby (SE); Mattias Hansson, Lund (SE); Joakim Persson, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/461,766

(22) Filed: Dec. 15, 1999

Related U.S. Application Data
(60) Provisional application No. 60/130,944, filed on Apr. 26, 1999.

(51) Int. Cl.⁷ .............................. H04L 9/08; H04L 9/16
(52) U.S. Cl. ............................. 380/44; 713/171; 705/71
(58) Field of Search ........................ 380/44; 713/171; 705/71

(56) References Cited

U.S. PATENT DOCUMENTS

| | | | |
|---|---|---|---|
| 4,649,419 A | * 3/1987 | Arragon et al. ............... 380/215 |
| 4,760,600 A | * 7/1988 | Nakai ........................... 380/264 |
| 4,797,921 A | * 1/1989 | Shiraishi ...................... 380/28 |
| 5,199,072 A | 3/1993 | White et al. |
| 5,278,905 A | 1/1994 | McNair ........................ 380/44 |
| 5,631,962 A | 5/1997 | Balph et al. |
| 5,710,814 A | * 1/1998 | Klemba et al. ............... 713/173 |
| 5,724,428 A | * 3/1998 | Rivest .......................... 380/37 |
| 5,727,063 A | * 3/1998 | Aiello et al. .................. 380/46 |
| 5,729,559 A | * 3/1998 | Bright et al. ................. 714/786 |
| 5,778,074 A | * 7/1998 | Garcken et al. .............. 380/37 |
| 5,799,087 A | * 8/1998 | Rosen .......................... 705/69 |
| 5,815,573 A | * 9/1998 | Johnson et al. ............. 380/286 |
| 5,825,890 A | * 10/1998 | Elgamal et al. ............. 713/151 |
| 5,850,443 A | * 12/1998 | Van Oorschot et al. ..... 380/285 |
| 5,862,159 A | * 1/1999 | Seshan ........................ 714/807 |
| 5,883,956 A | 3/1999 | Le et al. ....................... 380/4 |
| 5,917,912 A | * 6/1999 | Ginter et al. ................ 713/187 |
| 5,937,066 A | * 8/1999 | Gennaro et al. ............. 380/286 |
| 6,252,958 B1 | * 6/2001 | Rose ............................ 380/28 |
| 6,438,691 B1 | * 8/2002 | Mao ............................. 713/176 |

FOREIGN PATENT DOCUMENTS
WO WO97/05720 2/1997

OTHER PUBLICATIONS

Shaheen, Kamel M., Code Book Cipher System, 1994, IEEE, pp. 68.*
Mihalijevic', Miodrag, "A Fast and Secure Cipher Based on Celluar Automation Over GF(q)", 1998, IEEE.*
Park, Stephen and Miller, Keith, "Random Number Generators: Good Ones are Hard to Find", 1988, vol. 31, No. 10 pp. 1192–1201.*

* cited by examiner

Primary Examiner—Gregory Morse
Assistant Examiner—Mossadeq Zia
(74) Attorney, Agent, or Firm—Potomac Patent Group PLLC

(57) ABSTRACT

The present invention includes a method and device for calculating an encryption key, $K'_c$, for use in the initialization of an encryption algorithm. The present invention discloses a method for calculating the encryption key, $K'_c(x)$, by obtaining a ciphering key, $K_c(x)$, determining a maximum ciphering key length, L, based on the requirements of the two devices wishing to communicate, and determining a maximum usable encryption key length, $L_{max}$. The ciphering key, $K_c(x)$, is then manipulated through an addition function or an exclusively-or function with a polynomial $g_1(x)$. The result is multiplied with a polynomial $g_2(x)$, which spreads the starting points of said encryption key, $K'_c(x)$. The encryption key is thus determined according to $K'_c(x) = g_2^{(L)}(x)[K_c(x) \mod g_1^{(L)}(x)]$. The method of calculating the encryption key, $K'_c$, ensures that a maximum ciphering key length is not exceeded. In addition, the method provides new possible starting points each time a new encryption key, $K'_c$, is generated.

28 Claims, 4 Drawing Sheets

METHOD AND DEVICE FOR EFFECTIVE KEY LENGTH CONTROL

RELATED APPLICATION

This application is related to, and claims priority from, U.S. Provisional Patent Application Serial No. 6/130,944, entitled "Method and Device for Effective Key Length Control," filed on Apr. 26, 1999, the disclosure of which is incorporated here by reference.

BACKGROUND

The present invention relates to encryption, and in particular to a method and device for providing a controllable and secure way of determining an encryption key for use in an encryption algorithm.

In communication systems, data is often encrypted before transmission to assure privacy and data integrity. The encryption of data takes place in an encryption algorithm. The encryption algorithm manipulates or encodes the transmission data using other data, mathematical operations and/or other means to perform such encryption. For example, the encryption algorithm utilizes a data parameter known as an encryption key, referred to herein by the variable $K'_c$, in its initialization procedure. The encryption key is created in part from a ciphering key or secret key, referred to herein as $K_c$, where $K_c$ is known to both the receiving device and the transmitting device for encrypting and decrypting the data.

Governments regulate export communication parts and devices that are used in the encryption and transmission of data, including but not limited to, encryption software and hardware. Such export regulations differ among different countries. Specifically, governments regulate the maximum allowable key length of ciphering keys available to the export devices. The users who transmit and receive encrypted data would prefer to use the best possible, that is, the longest possible, ciphering key, to maximize security; however, these users are limited by governmental regulations of the ciphering key.

Assume current technology provides for key lengths of the ciphering key, $K_c$, to be between 1 and 160 bytes (8 and 1280 bits). Governments typically limit the maximum allowable ciphering key length to, for example, 7 bytes (56 bits). To go beyond this ciphering key length, a manufacturer would have to apply for an export license. Communication devices, e.g., cellular phones, typically utilize the maximum ciphering key length permitted for the particular device under the applicable export regulations. The maximum ciphering key length should be stored in such a way to prevent users from easily manipulating the parameter to ensure compliance with governmental regulations. For example, this parameter could be stored in READ ONLY memory (ROM). However, from a manufacturing point of view, it is desirable to produce communication devices that are able to work in many different countries, thereby avoiding customization and permitting a user to use the same communication device in different geographic locations. The manufacturer would prefer to make a universal product with a standardized method of encryption that complies with the different regulations set by a variety of governments and also provides a high level of data security.

Currently, an encryption key, $K'_c$, together with other public parameters, such as a master clock, is used in the initialization of an encryption algorithm. Encryption key, $K'_c$, utilizes the ciphering key, $K_c$, and a public random number, designated RAND, in accordance with the following equation:

$$K'_c[0 \ldots 15] = \begin{cases} K_c[0 \ldots L-1] \cup RAND[L \ldots 15], & L < 16, \\ K_c[0 \ldots 15], & L = 16. \end{cases} \quad \text{(EQ. 1)}$$

where L is $1 \leq L \leq \min\{L^A_{max}, L^B_{max}\}$ in bytes; and where RAND $[L \ldots 15]$ denotes the bytes L through 15 of RAND.

For exemplary purposes, the maximum usable encryption key length in bytes, $L_{max}$, is assumed to be 16 bytes, although different encryption key lengths could be used.

As disclosed by the above equation, the encryption key, $K'_c$, is created by affixing a random number to the end of the ciphering key, $K_c$, to complete the entire amount of available bytes for the encryption key length, i.e., 16 bytes in this case. The parameter L represents the smaller ciphering key length allowed between two ciphering key lengths, $L^A_{max}$ and $L^B_{max}$ of first communication device A and second communication device B which are manufactured under different governmental regulations. In other words, the ciphering key length used in computing the encryption key, $K'_c$, is the lesser of the two ciphering key lengths allowed to be used by the first and second communication devices A and B. Both devices can use encrypted communications with the smaller key length, but only one device can use encrypted communication with the larger key length.

One problem with the above equation for generating encryption key, $K'_c$, is that it is difficult to ensure that the hardware implementing the encryption algorithm is not altered by software that overrides the preset values of $L_{max}$. Furthermore, the RAND parameter, being public, can be misused to achieve an effective key length is not restricted at all, i.e., $K'_c$ has a maximum number of effective key bits.

An alternative solution is to reduce the space provided for the encryption key, $K'_c$, to L bytes in the memory of the communication device to prevent the software from altering this length. This can be accomplished by "masking out" the entire amount of available bytes minus L bytes of the ciphering key, $K'_c$, and ignoring the RAND. For example, in this case, because the maximum encryption key length is assumed to be 16, 16 minus L bytes would be "masked out," or in other words, replaced with zeros or some other fixed string. The resulting encryption key, $K'_c$, would then consist of $K_c$ for the first L bytes and zeros or some other fixed string for the next 16-L bytes (128-8L bits).

However, for small byte values of L, at least two undesirable consequences result from this solution. First, during the initialization of the encryption algorithm, the encryption algorithm shuffles the encryption key, $K'_c$, and determines a starting point of the encryption algorithm. To achieve a strong encryption, the shuffling period would need to be increased because of the "non-randomness" of the large fixed string in the 16 minus L bytes, where L is small. As the length of the "random" part of the encryption key decreases, the encryption algorithm would ideally increase the shuffling period, or number of iterations performed, in determining a starting point of the encryption key to compensate for the small length of "random" bits to achieve a better encryption. However, the number of the iterations able to be performed is limited by the strict timing requirements set in transmitting/receiving switching. Thus, this creates a risk of a weak encryption.

Second, an unauthorized person attempting to decrypt the encrypted data or performing a "ciphering attack," would only need to consider or analyze the first L bytes of the ciphering key, $K_c$. In other words, the unauthorized person would only need to analyze the possible combinations of data in L bytes rather than the larger maximum usable encryption key length, in this case, 16 bytes, for small values of L. This creates a risk of unauthorized decryption.

In general, a good encryption algorithm receives as its input, one of, for example, $2^{8L}$ possible starting points in a binary system. Where L is 16 bytes, a good encryption algorithm would receive $2^{128}$ possible starting points in a binary system. Each of the possible combinations of the 8L $K'_c$ bits would define one starting point out of the $2^{8L}$ starting points. An unauthorized person trying to decrypt encrypted data would have to try up to $2^{8L}$ possible combinations to do so. Fewer starting points are available where governmental regulations have restricted the key length. For example, if a government restricts a ciphering key length to a maximum of 5 bytes (40 bits), an encryption algorithm would have a reduced number of starting points, that is $2^{40}$ starting points. Moreover, if one considers the space, or memory, available for storing all the possible $2^{8L}$ starting points, current technology typically restricts the total available memory to a specific area of the memory for storing the reduced number of starting points and does not use the remaining part of the memory. The remaining positions are constant. Thus, an unauthorized person trying to decrypt encrypted data would only have to analyze $2^{40}$ starting points and the unauthorized person would know where such starting points where located in memory.

SUMMARY

Accordingly, to overcome the above-mentioned problems, the present invention describes a method by which when an encryption key, $K'_c$, is generated, the total possible starting points are restricted to a subset of $2^{8L}$ starting points, where the subsets are different each time a new $K'_c$ is generated over the total available memory or space. Thus, the starting points are no longer stored in the same location after every generation of a new encryption key, $K'_c$.

In addition, the present invention provides an interface between the generator of the ciphering key, $K_c$, in a communications system and the ciphering device that uses the ciphering key in encrypting data. The interface provides a controllable and secure way of limiting the key length to conform to the effective key length set by governmental regulations by including an addition or modulus function in the calculation of the encryption key, $K'_c$.

Moreover, the present invention provides for communication between two devices that are regulated by different governments setting different maximum ciphering key lengths.

Furthermore, the present invention provides for an encryption key, $K'_c$, where the "randomness" is spread over all the possible combinations of starting points for input into the encryption algorithm of the ciphering device.

The above and other advantages of the present invention are carried out in one form by a communication device for determining an encryption key for use in an encryption algorithm. The communication device comprises a memory element for storing one or more polynomials; a plurality of switching elements, each having a first input, a second input and an output, where the switching element first inputs are connected to the memory element; a plurality of delay elements, each having an input and an output, where the output of one delay element is connected to the switching element second inputs; and a plurality of addition or modulo functions, each having a first input, a second input and an output, where the modulo first inputs are connected to all but one of the delay element outputs, where the modulo second inputs are connected to all but one of the switching element outputs and where the modulo outputs are connected to all but one of the delay element inputs. The delay elements may be in the form of a shift register.

The above and other advantages of the present invention are also carried out in another form by a method for calculating an encryption key, $K'_c(x)$, for use in an encryption algorithm. The method comprises the steps of obtaining a ciphering key, $K_c(x)$; determining a maximum ciphering key length, L; determining a maximum available encryption key length, $L_{max}$, obtaining a polynomial $g_1(x)$, wherein the highest degree is equal to $L_{max}$; obtaining a polynomial $g_2(x)$, for spreading starting points of said encryption key, $K'_c(x)$; and calculating the encryption key, $K'_c(x)$, where $K'_c(x)=g_2^{(L)}(x)[K_c(x) \bmod g_1^{(L)}(x)]$.

BRIEF DESCRIPTION OF THE DRAWINGS

A more complete understanding of the present invention may be derived by referring to the detailed description and claims when considered in connection with the Figures where:

DETAILED DESCRIPTION

Figure 1:
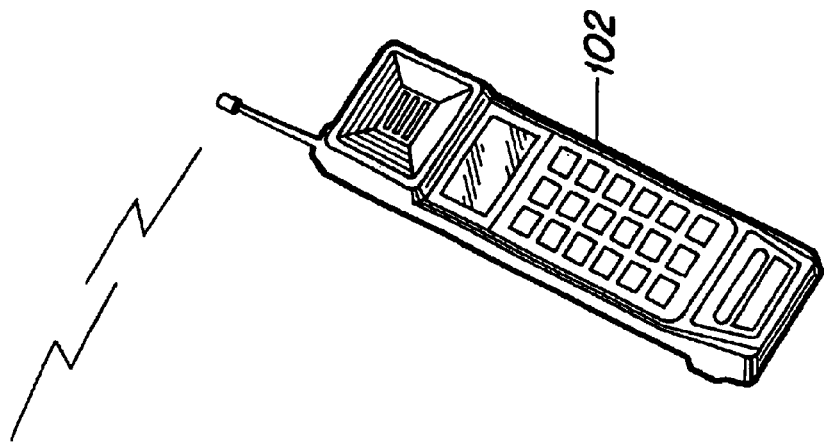
FIG. 1 shows two mobile communication devices transmitting and receiving data in accordance with the present invention.
Figure 1:
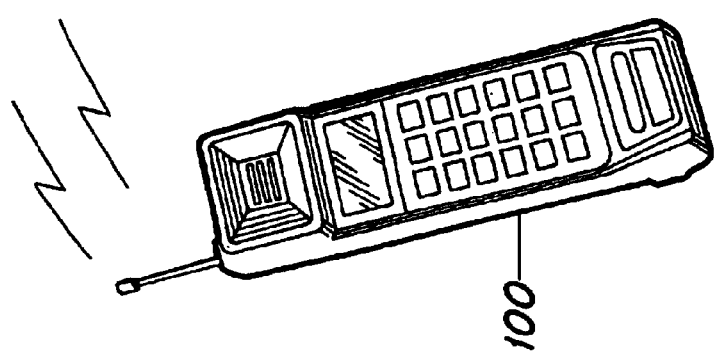

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

To ensure conformance to a regulated key length and improve the encryption of a data transmission between two or more devices, an encryption key, $K'_c$, is determined or calculated and input into an encryption algorithm in accordance with the present invention according to the following formula:

$$K'_c(x)=g_2^{(L)}(x)[K_c(x) \bmod g_1^{(L)}(x)] \qquad (\text{Eq. 2})$$

where:

L is the maximum restricted ciphering key length in bytes and is $1 \leq L < \min\{L^A_{max}, L^B_{max}\}$, and deg $(g_1(x))$+deg $(g_2(x)) \leq wL$ for all L bytes where w is a word length in bits.

The encryption key, $K'_c$, is written above in terms of a polynomial expression for exemplary purposes.

As disclosed in Eq. 2, the encryption key, $K'_c$, is based in part on the ciphering key, $K_c$. The ciphering key, $K_c$, can be obtained in any suitable way now known or later discovered.

For example, the ciphering key, $K_c$, can be independently communicated to a Device A and a Device B from a third device to facilitate encryption and decryption. Alternatively, Device A can have ciphering key, $K_c$, stored and can communicate this to Device B. Assume current technology permits a ciphering key length to be between 1 and 160 bytes (8 and 1280 bits) in length. However, the governments from which Device A and Device B are exported have placed certain restrictions on the maximum length of the ciphering key. For example, assume Device A can communicate with a maximum key length of 5 bytes (40 bits) and Device B can communicate with a maximum key length of 7 bytes (56 bits). Once it is determined that Device A desires to transmit data to Device B, Device A and Device B "negotiate" an acceptable maximum key length, L, with which they can both communicate. Specifically, Device A and Device B will transmit and receive data to and from each other that specifies each devices's maximum key length. In this example, because $L^A_{max}$, is 40 bits and $L^B_{max}$ is 56 bits, the devices will "agree" to communicate with a maximum ciphering key length, L, of the lesser key length, or 40 bits.

Thus, in accordance with the present invention, the maximum possible key length is restricted to the minimum of the maximum key lengths between the Devices A and B. This key length restriction is implemented in the encryption through the addition or modulo function and the selection of the polynomial $g_1(x)$.

In an exemplary embodiment, $g_1(x)$ may be represented as the following polynomial:

$$g_1(x) = \sum_{i=0}^{wL} g_i^{(1)} x^j, g_{wL} \neq 0 \quad \text{(Eq. 3)}$$

where w equals a word length and L equals a number of words of ciphering key.

The polynomial $g_1(x)$ is created such that the highest degree of the polynomial will be that of the maximum allowable key length in bits. For example, if the word length is 8 bits and the number of words is 5, the highest degree of the $g_1(x)$ polynomial will be 40. Thus, the polynomial $g_1(x)$ could be, for example, as follows:

$$g_1(x) = Ax^{40} + Bx^{39} + Cx^{38} + \ldots + Dx + E, A \neq 0 \quad \text{(Eq. 4)}$$

The addition or modulo operation ensures that the key length is wL bits since the maximum degree of the remainder cannot exceed one less than the highest degree of the denominator. In this example, the computation of the operation $K_c(x) \bmod g_1^{(L)}(x)$ will yield a result where the highest degree possible is one less than 40, i.e., 39. The result has 40 bits which complies with the maximum allowable key length.

The polynomial $g_1(x)$ can be accessed from a table, for example, which identifies an appropriate $g_1(x)$ polynomial for a given L. This table is preferably located in the hardware so that the available $g_1(x)$ polynomials are secure. The $g_1(x)$ polynomials are thus protected from tampering to ensure compliance with governmental regulations. It will be recognized that a table is one way to store or obtain $g_1(x)$ polynomials but that other ways known in the art may also be used.

As discussed above, a good encryption algorithm receives as its input, one of $2^{8L}$ possible starting points in a binary system, L being the maximum ciphering key length possible in bytes. Each of the possible combinations of the 8L $K'_c$, bits would define one starting point out of the $2^{8L}$ starting points. An unauthorized person trying to decrypt encrypted data would have to try up to $2^{8L}$ possible combinations to do so.

For example, if L equals 16 bytes, a good encryption algorithm receives as its input, one of $2^{128}$ possible starting points in a binary system. Each of the possible combinations of the 128 $K'_c$ bits would define one starting point out of the $2^{128}$ starting points. An unauthorized person trying to decrypt encrypted data would have to try up to $2^{128}$ possible combinations to do so.

In the above example with Device A and Device B, an encryption algorithm would have a reduced number of starting points because of the smaller value of L, that is $2^{40}$ starting points. Current technology typically restricts the total available memory (in this case, $2^{40}$ possible starting points) to a specific area of the memory for storing the reduced number of starting points and does not use the remaining part of the memory. The remaining positions are constant. Thus, in this example under current technology, an unauthorized person trying to decrypt encrypted data would only have to analyze $2^{40}$ starting points and the unauthorized person would know where such starting points were located in memory.

In other words, if the encryption key, $K'_c(x)$, resulted solely from $K_c(x) \bmod g_1^{(L)}(x)$, $K'_c(x)$ would be stored in one specific part of memory according to current technology. The other bits would be zero or some other fixed string. The starting points would then be located in a specific subset of all the possible starting points. To increase the strength of the encryption, however, it is beneficial to have the starting points spread out over all the possible bits.

Hamming distance is a value that reflects the number of distinct bits in two data strings. The greater the Hamming distance among the possible starting points, the better the encryption. If the starting points are always located in a specific subset of positions, the Hamming distance, and thus the encryption, will be poor. The present invention provides a method and device by which the starting points are spread out in a more effective way rather than being confined to a specific subset of bits so that the minimum distance between the starting points becomes larger.

This concept of increasing the distance or "spreading" is known in the art. For example, error correction coding uses this concept for a different application. Thus, to spread out the starting points over the possible bit range, the result of the $K_c(x) \bmod g_1^{(L)}(x)$ operation is multiplied by a polynomial $g_2(x)$, where an exemplary $g_2(x)$ polynomial is as follows:

$$g_2(x) = \sum_{j=0}^{w(L_{max}-L)} g_j^{(2)} x^j \quad \text{(Eq. 5)}$$

where w equals a word length, L equals a number of words of the ciphering key and $L_{max}$ equals a maximum number of words usable in the encryption key.

The multiplication of $g_2(x)$ with the result of $K_c(x) \bmod g_1^{(L)}(x)$ will "spread" the result of $K_c(x) \bmod g_1^{(L)}(x)$ over the entire bit area. The appropriate $g_2(x)$ polynomial will be selected based upon a given L as is currently known in the art. That is, for different key lengths, L, different coefficients of the $g_2(x)$ polynomial are selected to more effectively achieve desirable Hamming distances. For small values of L, one set of coefficients might achieve desirable Hamming distances while for large values of L, a different set of coefficients would be more appropriate to achieve desirable Hamming distances. In the binary case, $g_2(x)$ may be found as a generator polynomial of a BCH error-correcting code. The $g_2(x)$ polynomials can be stored either in a table which relates appropriate $g_2(x)$ polynomials for a given L. This table may be the same table in which $g_1(x)$ is stored or in another table. The $g_2(x)$ polynomials may be stored either in hardware or in software of the ciphering device. It will be recognized that a table is one way to store an retrieve $g_2(x)$ polynomials but that other ways known in the art may also be used. Alternatively, the $g_2(x)$ polynomials may be obtained from memory at some other location, i.e., not located within the ciphering device.

$K'_c(x)$ results from this multiplication. $K'_c(x)$ is input into an encryption algorithm for use in encrypting data.

FIG. 1 shows mobile communication devices 100, 102 transmitting and receiving data from each other in accordance with the present invention. Devices 100, 102 can be any sort of hard wired or wireless device, including, without limitation, a cellular telephone or a computer.

Figure 2:
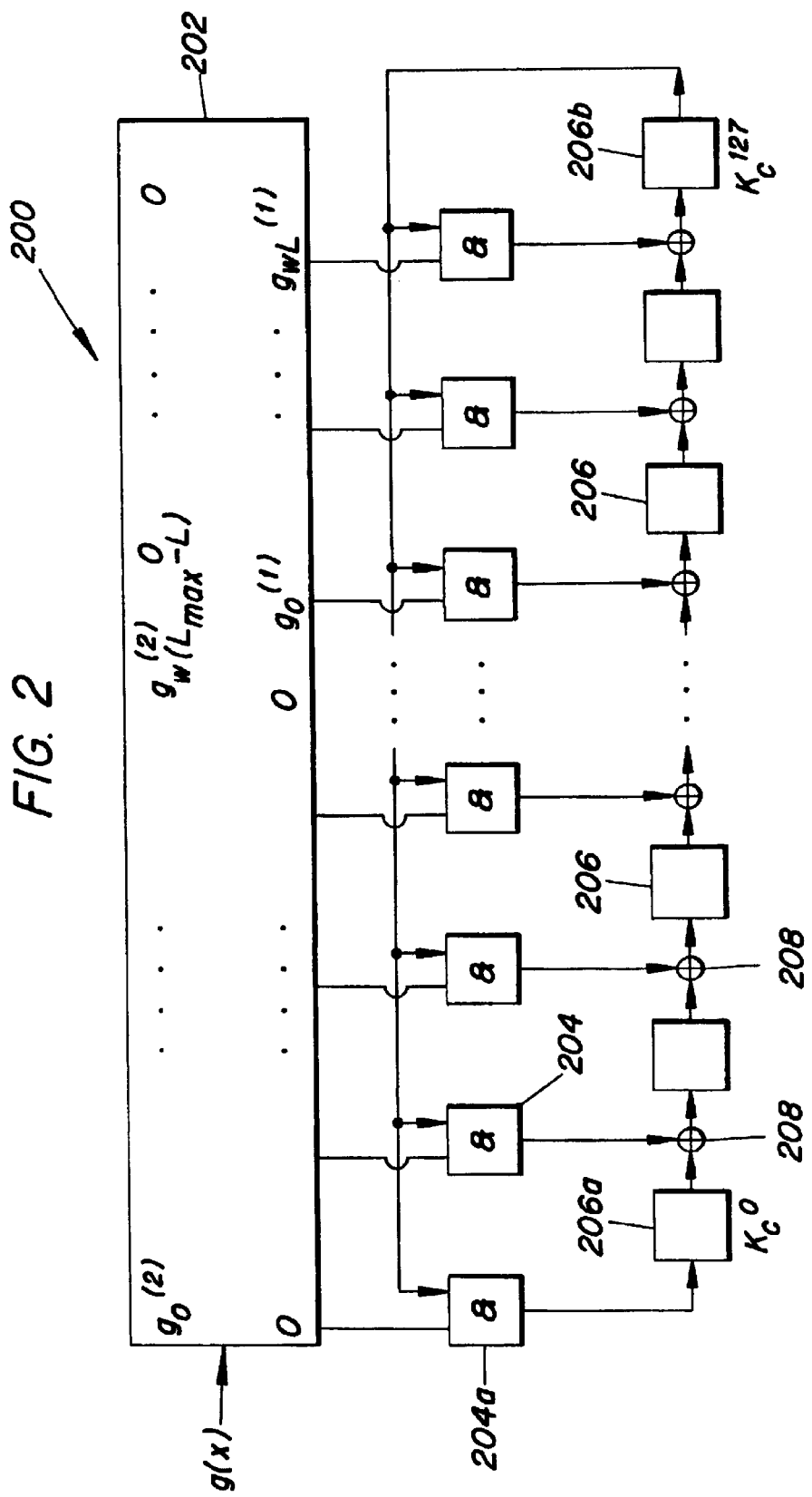
FIG. 2 shows a schematic for computing an encryption key, $K'_c$, in accordance with the present invention.

FIG. 2 shows a more detailed view of a communication device 200. Communication device 200 includes a memory element 202, a plurality of switching elements, such as AND gates 204, a plurality of delay elements 206, and a plurality of addition or modulo functions 208.

Memory element 202 stores polynomial $g_1(x)$. Memory element 202 may be a look-up table or some other arrangement of stored information. Memory element 202 may also store polynomial $g_2(x)$. Alternatively, $g_2(x)$ may be stored in some other location within communication device 200 or may be obtained from some other location external to, but accessible to, communication device 200. For exemplary purposes, memory element 202 is described herein as storing both $g_1(x)$ and $g_2(x)$. The functions $g_1(x)$ and $g_2(x)$ are polynomials having specified coefficients, e.g., those described above.

Switching elements or AND gates 204 each have a first input, a second input and one output. Memory element 202 is connected to the first inputs of AND gates 204. Each delay element 206 has one input and one output. Delay elements 206 can be implemented as a shift register. The output of one of the AND gates 204a is connected to the input of a first delay element 206a. Modulo functions 208 each have a first input, a second input and one output. The outputs of the remaining AND gates 204 are connected to first inputs of modulo functions 208. The outputs of all delay elements 206, except for a last delay element 206b, are connected to the second inputs of modulo functions 208. The output of the last delay element 206b is connected to the second input of AND gates 204. The outputs of modulo functions 208 are connected to the inputs of all delay elements 206 but first delay element 206a.

For exemplary purposes, assume a binary scheme for simplicity; however, those skilled in the art will appreciate that the present invention is equally applicable to other symbol representations.

Initially, communication devices 100, 102 as shown in FIG. 1 will "negotiate" or communicate between themselves to determine the maximum ciphering key length, L, that both devices 100, 102 can use to communicate, as discussed above. Devices 100, 102 might, for example, exchange each device's respective maximum ciphering key length. Devices 100, 102 then "agree" on a maximum ciphering key length, L, by selecting the smaller of the two ciphering key lengths required for each device, if the ciphering key lengths, L, differ.

Referring again to FIG. 2, the first input of AND gates 204 is the $g_1(x)$ binary polynomial from memory element 202. The first $w(L_{max}-L)$ coefficients are zero and the last wL coefficients can be non-zero numbers. In this case, w equals the word length, for all $w \geq 1$, L equals the "negotiated" number of words of the ciphering key, for all $L \geq 1$, $L_{max}$ equals the maximum number of usable words in the encryption key, for all $L_{max} \geq 1$. The second input of AND gates 204 are initialized to zero. Thus, the output of AND gates 204 is zero for each gate corresponding to the first $w(L_{max}-L)$ bits. For the last wL bits, the output of AND gates 204 are a function of the coefficients of the $g_1(x)$ polynomial for each gate corresponding to the last wL coefficients. When the coefficient for $g_1(x)$ is 0, AND gate 204 will open. Conversely, when the coefficient for $g_1(x)$ is 1, AND gate 204 will close.

Figure 3:
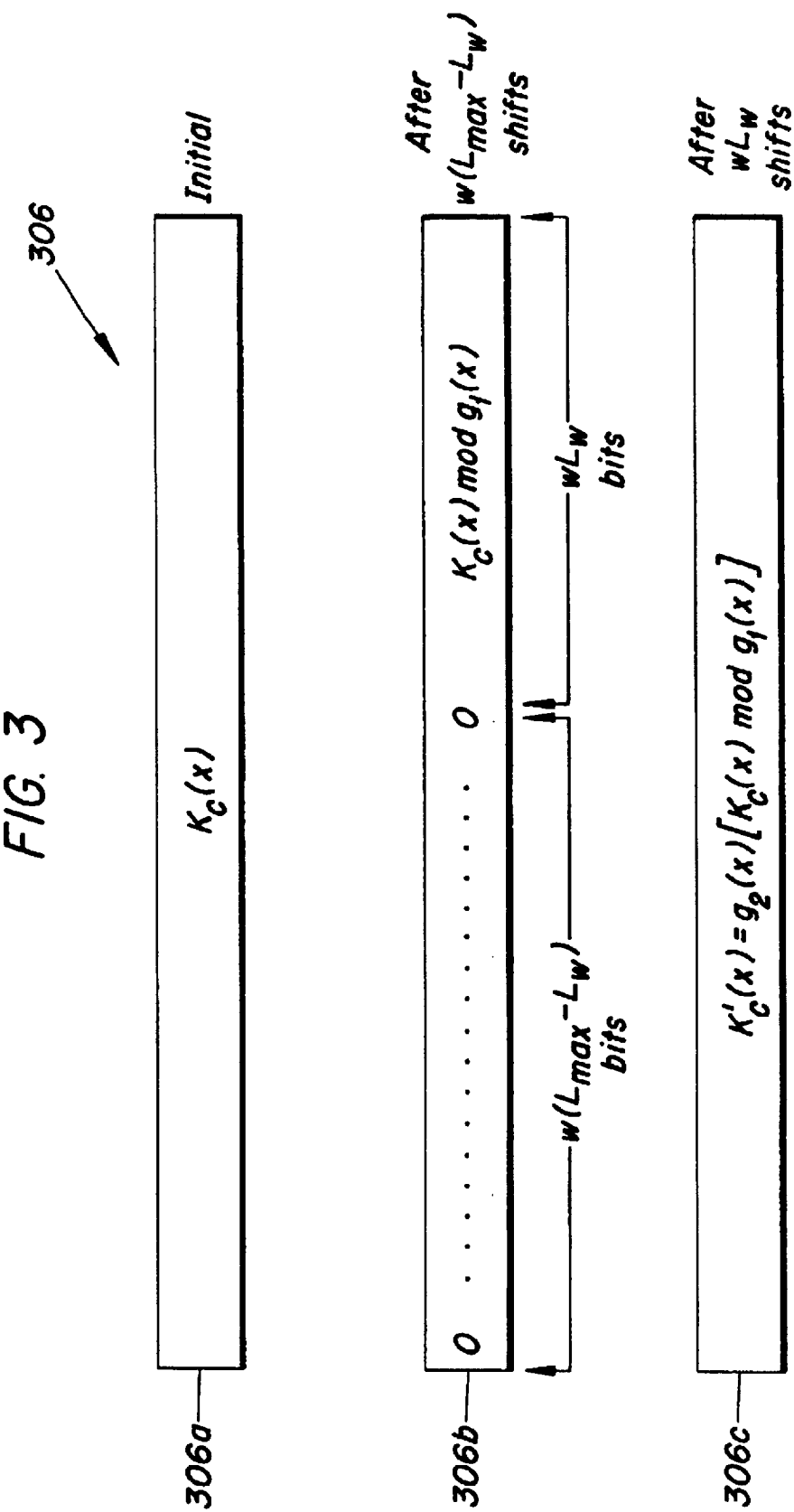
FIG. 3 shows a shift register in accordance with the schematic of FIG. 2 at different time intervals in accordance with the present invention.

Delay elements 206 are initialized with the coefficients of the ciphering key, $K_c(x)$ (as shown in shift register 306a of FIG. 3.) These coefficients, as well as the outputs of AND gates 204, are input into exclusive-or functions 208. (This is for the binary case. In cases other than binary, these coefficients are input into another appropriate addition function.) The initial inputs of AND gates 204 are a string of zeros and the $g_1(x)$ coefficients as described above. The outputs of exclusive-or functions 208 are input into all delay elements 206, except for first delay element 206a. The output of last delay element 206b is fed back into the second inputs of all AND gates 204. This process is then repeated as the data is shifted, in accordance with available cycles, clock pulses or other timing mechanisms.

Ciphering key, $K_c(x)$, is initially located in delay elements 206 (or a shift register as shown in 306a in FIG. 3). As the above described, computations are performed utilizing the ciphering key, $K_c(x)$. Ciphering key, $K_c(x)$, is shifted out of delay elements 206. The output of last delay element 206b is input into AND gates 204 at those positions where AND gates 204 are closed. After the completion of $w(L_{max}-L)$ shifts, delay elements 206 contain the result of the exclusive-or function, $K_c(x) \mod g_1^{(L)}(x)$ in the last wL spaces (as shown in shift register 306b in FIG. 3). As stated above, this computation ensures that the maximum key length of the ciphering key, $K_c(x)$, does not exceed the governmental regulations of the maximum permitted key length.

After the completion of $w(L_{max}-L)$ shifts, $g_2(x)$ is input into AND gates 204. In contrast to $g_1(x)$, $g_2(x)$ is a polynomial where the first $w(L_{max}-L)$ coefficients can be non-zero numbers and the last wL coefficients are zeros. The above process continues for wL more shifts. The wL bits resulting from exclusive-or functions have now been "spread" over the area. The result in delay elements 206 (as shown in shift register 210c in FIG. 3) is encryption key, $K_c(x)$, which can then be input into a suitable encryption algorithm for encrypting data.

For exemplary purposes, assume w equals 8, L equals 5, $L_{max}$ equals 16. Assume again a binary scheme for simplicity.

Referring again to FIG. 2, the first input of AND gates 204 is the $g_1(x)$ binary polynomial from memory element 202. The first $w(L_{max}-L)$, or 88, coefficients are zero and the last wL, or 40, coefficients can be non-zero numbers. The second input of AND gates 204 are initialized to zero. Thus, the output of AND gates 204 is zero for each gate corresponding to the first 88 bits. For the last 40 bits, the output of AND gates 204 are a function of the coefficients of the $g_1(x)$ polynomial for each gate corresponding to the last 40 bits. When the coefficient for $g_1(x)$ is 0, the AND gate will open. Conversely, when the coefficient for $g_1(x)$ is 1, the AND gate will close.

Delay elements 206 are initialized with the coefficients of the ciphering key, $K_c(x)$. These coefficients, as well as the outputs of AND gates 204, are input into exclusive-or functions 208. (The initial inputs of AND gates 204 are a string of zeros and the $g_1(x)$ coefficients as described above.)

The outputs of exclusive-or functions 208 are input into all AND gates 206, except for first AND gate 206a. The output of last delay element 206b is input into AND gates 204 at those positions where AND gates 204 are closed. This process is then repeated as data is shifted.

Ciphering key, $K_c(x)$, is initially located in 128 delay elements 206 (or in a 128 bit shift register as shown in 306a in FIG. 3). As the above described computations are performed utilizing the ciphering key, $K_c(x)$. Ciphering key, $K_c(x)$, is shifted out of delay element 206. The output of last delay element 206b is input into AND gates 204. After the completion of 128-40, or 88 shifts, delay elements 206 contain the result of the exclusive-or function, $K_c(x)$ mod $g_1^{(L)}(x)$ in the last 40 spaces.

The $g_2(x)$ coefficients are then input into AND gates 204. The above process continues for 40 more shifts, or a total of 128 shifts. The 40 bits resulting from exclusive-or function have now been "spread" over the area. The result in delay elements 206 (or in shift register 306c as shown in FIG. 3) is encryption key, $K'_c(x)$, which can then be input into a suitable encryption algorithm for encrypting data.

Figure 4:
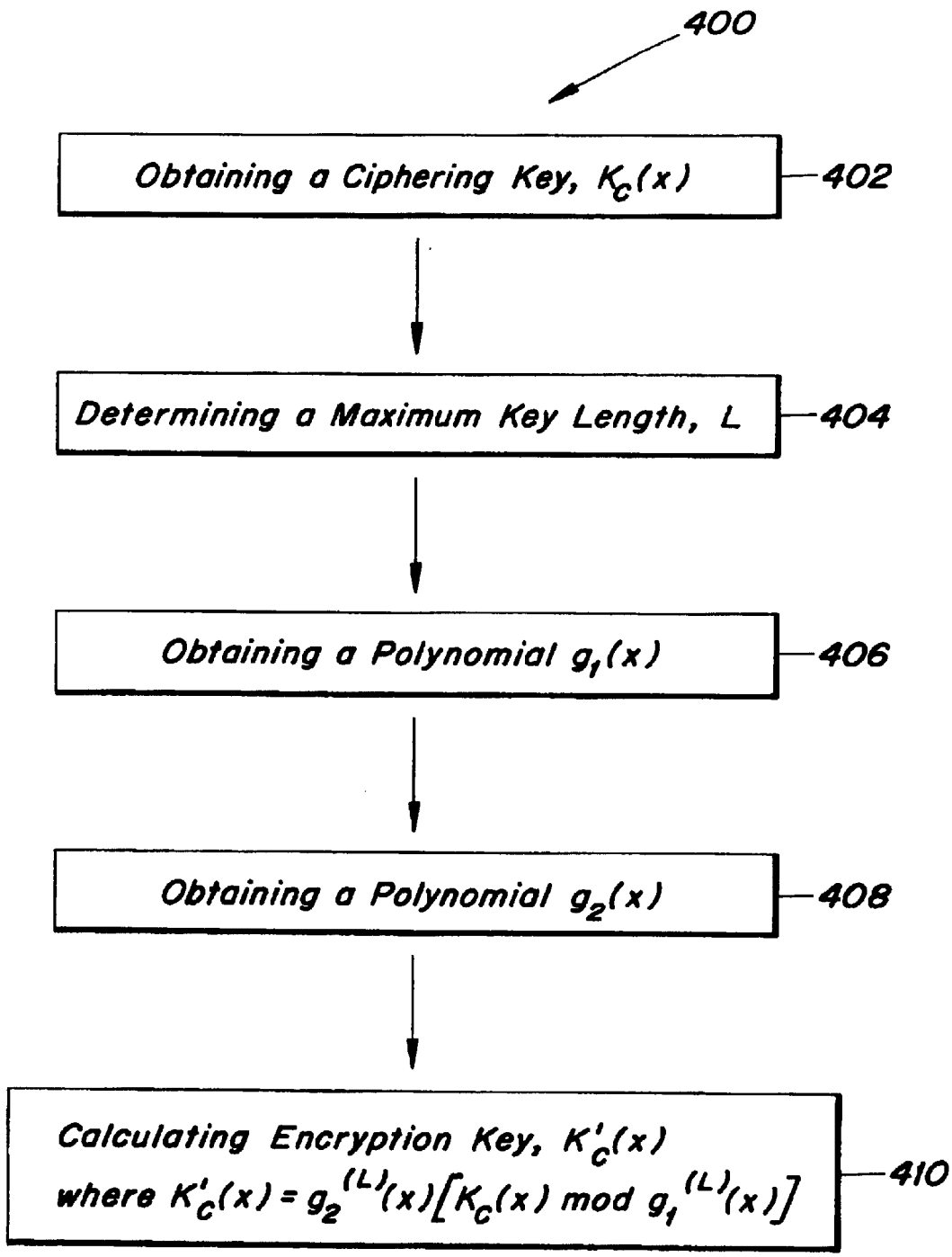
FIG. 4 shows a block diagram of a method for computing an encryption key, $K'_c$, in accordance with the present invention.

FIG. 4 shows a block diagram of a method 400 for computing the encryption key, $K'_c$, to encrypt data in accordance with the present invention. Method 400 includes the step of obtaining a ciphering key, $K_c(x)$ 402. As described above, ciphering key, $K_c(x)$ can be obtained in any number of ways known in the art. Next, the step of determining a maximum ciphering key length, L, 404 is performed. The maximum key length is typically a value in bytes. The devices that wish to communicate will exchange information or "negotiate" regarding the maximum ciphering key length with which each device can communicate. Typically, the maximum key length will be set to the largest negotiated available key length with which both devices can communicate. A polynomial $g_1(x)$ is then obtained according to step 406. Polynomial $g_1(x)$ is then mathematically manipulated with the ciphering key, $K_c(x)$ according to the function $K_c(x)$ mod $g_1(x)$ to achieve a first result. A polynomial $g_2(x)$ is then obtained a according to step 408. Step 408 spreads the starting points, or increases the Hamming distance, of encryption key, $K'_c(x)$. An appropriate polynomial $g_2(x)$ is selected based on the results of step 404. Finally, the encryption key, $K'_c(x)$, can be calculated according to step 410 where $K'_c(x) = g_2^{(L)}(x)[K_c(x) \bmod g_1^{(L)}(x)]$.

The present invention has been described above with reference to preferred embodiments. However, those skilled in the art will recognize that changes and modifications may be made without departing from the scope of the present invention. For example, although the present invention describes a method and device where the maximum ciphering key length, L, is 5 bytes, and the maximum usable encryption key length, $L_{max}$, is 16 bytes, it will be appreciated that the present invention is not so limited to these lengths. In addition, it will also be appreciated that the data being transmitted and received is not limited to any particular type of data. It may constitute voice, written or other data. It may be binary, ASCII or any other form of data. In addition, the data may be transmitted over any media now known, such a wires or air waves, or later discovered.

What is claimed is:

1. A communication device for calculating an encryption key, $K'_c$, by manipulating a ciphering key, $K_c$, for use in an encryption algorithm, said device comprising:

a memory element for storing one or more polynomials;

a plurality of switching elements, each having a first input, a second input and an output, wherein said switching elements first inputs are connected to said memory element;

a plurality of delay elements, each having an input and an output, where said output of one of said delay elements is connected to said switching elements second inputs; and a plurality of addition functions, each having a first input, a second input and an output, wherein:

the outputs of each of all but one of said delay elements is connected to a corresponding first input of one of the plurality of addition functions, the outputs of each of all but one of said switching elements is connected to a corresponding second input of one of the plurality of addition functions, and the inputs of each of all but one of said delay elements is connected to a corresponding output of one of the plurality of addition functions.

2. The device of claim 1, where said switching elements are AND gates.

3. The device of claim 1, wherein the memory element stores a polynomial $g_1(x)$, wherein $$g_1(x) = \sum_{i=0}^{wL} g_i^{(1)} x^i, \; g_{wL} \neq 0$$

and wherein w is a word length and L is a number of words of said ciphering key.

4. The device of claim 3, wherein the memory element stores a polynomial $g_2(x)$, wherein $$g_2(x) = \sum_{j=0}^{w(L_{max}-L)} g_j^{(2)} x^j$$

and wherein w is a word length, L is a number of words in said ciphering key, and $L_{max}$ is the maximum number of usable words in the encryption key, $K'_c$.

5. The device of claim 4, wherein said delay elements are initially loaded with said ciphering key, $K_c(x)$.

6. The device of claim 5, wherein said polynomial $g_1(x)$ has a first $w(L_{max}-L)$ coefficients equal to a fixed string.

7. The device of claim 6, wherein said polynomial $g_2(x)$ has a last wL coefficients equal to a fixed string.

8. The device of claim 7, wherein the last wL bits of said delay elements store a result of $K_c(x)$ mod $g_1(x)$ after $w(L_{max}-L)$ shifts.

9. The device of claim 8, wherein said delay elements store said encryption key, $K'_c$, after an additional wL shifts.

10. The device of claim 1, wherein said delay elements are a shift register.

11. A method for calculating an encryption key, $K'_c(x)$, to encrypt data comprising the steps of:

obtaining a ciphering key, $K_c(x)$;

determining a maximum ciphering key length, L;

determining a maximum usable encryption key length, $L_{max}$ obtaining a polynomial $g_1(x)$;

obtaining a polynomial $g_2(x)$, for spreading starting points of said encryption key, $K'_c(x)$; and calculating said encryption key, $K'_c(x)$, wherein $K'_c(x) = g_2^{(L)}(x)[K_c(x) \bmod g_1^{(L)}(x)]$.

12. The method of claim 11, further comprising the step of:

selecting said polynomial $g_2(x)$ based on L.

13. The method of claim 12, wherein $$g_1(x) = \sum_{i=0}^{wL} g_i^{(1)} x^i, g_{wL} \neq 0$$

and wherein a highest degree of said polynomial $g^1(x)$ is equal to wL.

14. The method of claim 13, wherein $$g_2(x) = \sum_{j=0}^{w(L_{max}-L)} g_j^{(2)} x^j.$$

15. The method of claim 14, wherein a first $w(L_{max}-L)$ coefficients of $g_1(x)$ are equal to a fixed string.

16. The method of claim 15, wherein a last wL coefficients of $g_2(x)$ are equal to a fixed string.

17. The method of claim 12, wherein said calculating step is performed using a plurality of AND gates, each having a first input, a second input and an output, a plurality of delay elements, and a plurality of addition functions.

18. The method of claim 17, said method further comprising the steps of: initializing said delay elements with said ciphering key, $K_c(x)$;
initializing said first inputs of said AND gates to said $g_1(x)$ polynomial coefficients; and
initializing said second inputs of said AND gates to zero.

19. The method of claim 17, wherein said delay elements are a shift register.

20. A system for communicating encrypted data between two communication devices comprising:
a first communication device having a first ciphering key length, $L^A{}_{max}$; and
a second communication device having a second ciphering key length, $L^B{}_{max}$; and
a means for determining a maximum ciphering key length, L, where $1 \leq L \leq \min \{L^A{}_{max}, L^B{}_{max}\}$;
said first device comprising:
a means for obtaining polynomials $g_1(x)$ and $g_2(x)$;
a means for obtaining ciphering function, $K_c(x)$; and
a means for calculating an encryption key, $K'_c(x)$, where $K'_c(x) = g_2^{(L)}(x)[K_c(x) \bmod g_1^{(L)}(x)]$.

21. The system of claim 20, wherein said means for calculating said encryption key, $K'_c(x)$, comprises:
a plurality of AND gates, each having a first input, a second input and an output, wherein said gate first inputs are connected to said memory element;
a plurality of delay elements, each having an input and an output, wherein said output of one delay element is connected to said gate second inputs; and
a plurality of addition functions, each having a first input, a second input and an output, wherein the outputs of each of all but one of said delay element is connected to a corresponding first input of one of the plurality of addition functions, wherein the outputs of each of all but one of said gate is connected to a corresponding second input of one of the plurality of addition functions and wherein the inputs of each of all but one of said delay element is connected to a corresponding output of one of the plurality of addition functions.

22. The system of claim 21, wherein said delay elements are initially loaded with said ciphering key, $K_c(x)$.

23. The system of claim 20, wherein said means for obtaining polynomials $g_1(x)$ and $g_2(x)$ includes retrieving said polynomials from a memory element contained within said first communication device.

24. The system of claim 23, wherein $$g_1(x) = \sum_{i=0}^{wL} g_i^{(1)} x^i, g_{wL} \neq 0.$$

25. The system of claim 24, wherein $$g_2(x) = \sum_{j=0}^{w(L_{max}-L)} g_j^{(2)} x^j.$$

26. The system of claim 25, wherein the last wL bits of said delay elements store the result of $K_c(x) \bmod g_1(x)$ after $w(L_{max}-L)$ shifts.

27. The system of claim 26, wherein said delay elements store said encryption key, $K'_c(x)$, after an additional wL shifts.

28. The system of claim 21, wherein said delay elements are a shift register.

* * * * *

UNITED STATES PATENT AND TRADEMARK OFFICE
CERTIFICATE OF CORRECTION

PATENT NO. : 6,947,560 B1
APPLICATION NO. : 09/461766
DATED : September 20, 2005
INVENTOR(S) : Ben Smeets et al.

It is certified that error appears in the above-identified patent and that said Letters Patent is hereby corrected as shown below:

Column 1, Line 7: Please change "6/130,944" to --60/130,944--

Column 5, Line 19: Please change " $L_{max}^{A}$, " to -- $L_{max}^{A}$ --

Column 5, Line 63: Please change " $8LK'_c$ ," to -- $8LK'_c$ --

Column 9, Line 38: Please change "obtained a according" to --obtained according--.

Signed and Sealed this

Twentieth Day of March, 2007

JON W. DUDAS
*Director of the United States Patent and Trademark Office*